United States Patent [19]

Hinterwaldner

[11] 4,101,501

[45] Jul. 18, 1978

[54] HARDENABLE ONE-COMPONENT SUBSTANCE, METHOD OF PRODUCING AND HARDENING SAME AND ITS APPLICATION

[76] Inventor: Rudolf Hinterwaldner, Kastanienstrasse 13, D 8-Munich 90, Germany

[21] Appl. No.: 714,331

[22] Filed: Aug. 13, 1976

[30] Foreign Application Priority Data

Aug. 14, 1975 [DE] Fed. Rep. of Germany ....... 2536319

[51] Int. Cl.² ............................................. C08K 9/10
[52] U.S. Cl. .............................. 260/40 R; 282/27.5;
260/6; 260/23 R; 260/37 EP; 260/42.14;
260/42.15; 428/308
[58] Field of Search .................... 260/6, 37 EP, 40 R;
428/308; 282/27.5

[56] References Cited

U.S. PATENT DOCUMENTS

| | | | |
|---|---|---|---|
| 2,978,340 | 4/1961 | Veatch et al. | 106/54 X |
| 3,395,105 | 7/1968 | Washburn et al. | 260/6 |
| 3,657,379 | 4/1972 | Hilbelink et al. | 260/6 X |
| 3,787,351 | 1/1974 | Olson | 260/37 EP X |
| 3,830,776 | 8/1974 | Carlson et al. | 260/37 EP |

*Primary Examiner*—Sandra M. Person
*Attorney, Agent, or Firm*—Toren, McGeady and Stanger

[57] ABSTRACT

A hardenable composition for use as an adhesive in sealing, spackling, filling, stamping and the like composed of a first component of a monomeric, oligomeric or polymeric compound and a hardening promoting agent, wherein the first component or the hardening promoting agent is encased in a protective casing to prevent rupturing of the casing or hardening of the composition, and a casing rupturing agent composed of microspheres which break under pressure into fragments which have angular edges or are acutely tapered.

16 Claims, No Drawings

HARDENABLE ONE-COMPONENT SUBSTANCE, METHOD OF PRODUCING AND HARDENING SAME AND ITS APPLICATION

BACKGROUND OF THE INVENTION

1. Field of the Invention

This invention relates to a liquid, pasty, thixotropic, semisolid or solid hardenable substance which is based on monomeric, oligomeric and/or polymeric compounds and one or more components that promote hardening, whereby at least the monomeric, oligomeric or polymeric compounds and/or the components promoting hardening are enclosed in a reaction-preventing protective casing containing a rupturing agent for the protective casing. The composition may contain other conventional additions.

More particularly, this invention relates to one-component substances in which at least one of the reaction partners, reaction initiators, reaction accelerators and/or adducts or additives are temporarily inactivated by protective casings.

One-component systems according to the present invention are intended to mean substances of mixtures of liquid, pasty, thixotropic, semisolid and/or solid reactive materials. They may, in addition, contain inert filling materials, pigments, dyes, plasticizers, bitumens, tars, pitches, resins and/or solvents. In addition, the invention relates to the production of such substances, the hardening of same and their application.

2. Description of The Prior Art

In practice, the advantages and the merits of two and more component substances based on an inorganic, organometallic and/or organic base are well known. However, these two and more component systems have several marked disadvantages due to which their application in many fields of engineering and trade is made impossible. Such negative features include the fact that they require intricate and/or unduly expensive two or more component dosing and mixing appliances, critical mixing ratios entailing the danger of errors in mixing, short pot and processing times, exothermic reactions when handling large batches, physiological doubts in regard to many reactive substances, etc.

Many efforts have been made to create one-pot or one-component systems that are free from these negative features. Thus, technical progress has been achieved by means of one-component systems reactivated by atmospheric moisture, (e.g., substances based on silicon rubbers, polyurethanes and polysulfides). However, for a number of reasons many two and more component systems cannot be reformulated to adapt them to moisture hardening or for processing in industrial practice. Furthermore, among other things, moisture hardening systems have the disadvantage that the hardening rates are very low (several days) and depend on the layer thickness and/or the relative humidity of the ambient air. In addition, the production of such moisture hardening systems calls for special care and expensive mixing appliances with vacuum equipment.

For this reason, attempts have been made in recent times to avoid the negative features of such systems by coating at least one of the two reaction partners with protective casings. For the jacketing or encasing of such liquid droplets and/or solid particles with chemically inert wall materials there are a number of known and preferred encapsulating techniques and particularly preferred is microencapsulation. For simplicity, reference hereinafter shall be made to microencapsulates and microencapsulated materials, even where, in general, protective casings are intended.

To obtain a temporarily effective inactivation of the substances, the protective casings must fulfill a multiplicity of requirements, as a result of which new critical parameters are established by the use of microencapsulated materials for this purpose. Thus, the protective casings or wall materials must be chemically inert to the internal and external phase, impervious to diffusion, unbreakable, elastic and flexible and possess stability to temperature changes. Furthermore, varying dipole moments must not result in an exchange of materials in the internal and external phase.

To ensure that the protective casings and wall materials possess these and other desired properties, various forms of aftertreatment are necessary. In many instances, specific shrinking and hardening methods are insufficient and it is necessary to draw secondary walls over the protective casings. However, this does result in protective casings that are impervious to diffusion, unbreakable and stabile to storage, which results in the smaller capsules being less destroyable by strongly increased pressures and/or shearing forces. Furthermore, the wall materials on small capsules are also stronger and more stabile, which is the reason for their decreased destructibility.

Another disadvantage prevails in the incorporation of microencapsulated materials into systems with high viscosity, thixotropy and/or a high degree of filling material, particularly with granular and acutely tapered filling materials. The high shearing forces necessary for the mixing process are, in many instances, so strong that, as a result, the protective casings are at least partially cracked and the reactive materials that issue forth initiate undesirable reactions.

Also, reactive substances that contain microencapsulated materials and are intended for precoating surfaces that are to be joined or sealed, have the further disadvantage that the predetermined wall thicknesses of the microencapsulated materials cannot be adapted to the changing tolerances and are movable within the hollow spaces of the joint. For example, if the hollow space of a joint is not completely filled with such a material, then, at least at the border surfaces, a full-surface binding effect will not be obtained, resulting in a loss of binding strength or leakiness. A further negative feature is that capsule rupture takes place only at the contact points so that only a partial hardening takes place. In such cases where the tolerances are smaller than the preselected layer thicknesses, the substance is deflected away from the precoated surfaces, so that, again, hollow unfilled joint spaces result. For example, in metallic plug-in connections, such deficiencies may result in defects due to the fact that pressure will not be applied and the substance will not react and, consequently the specified hardening is not achieved.

In order to avoid the negative features in regard to plug-in and joint connections, it has been suggested to scatter or strew friction bodies composed of a metal oxide into the applied, but still wet coating substance as rupturing agents for the protective casing. Beside the extra processing manipulations involved in the strewing-in and the subsequent elimination of superfluous friction bodies required where partial capsule breaking may already have occurred, an additional negative feature crops up due to the inhomogenous composition of the adhesive substance.

It has also been attempted to equip diverse substrate and material surfaces with dry, nonadhesive, adhesive layers having good storage stability containing microencapsulated solvents in which the solvents become reactive when subjected to pressure and/or impact. Practical use, however, has showed that the pressure and impact forces are not adequate to rupture the protective casing, particularly on relatively small capsules so that the outflowing solvent would reactivate the adhesive substance by swelling and dissolving.

The causes of the problems that crop up in regard to liquid, pasty, thioxotropic and semisolid substances for spackling, filling, stamping and coating purposes which contain microencapsulated substances are to be found in the lack of frictional effect and the minor mechanical forces involved in spackling and stamping, whereas substances with coarse-grained fillers have, to date, not been producible.

In German patent application DT AS 2 200 163, dry mortar and spackling compounds based on calcined gypsum are described which contain microencapsulated auxiliary materials. An inherent disadvantage of these substances is, among other things, that despite long swelling and dissolving periods and/or intense mechanical stress, only partial, and often only minor capsule destruction is obtained. Since the degree of capsule destruction, under the given conditions, is not a controllable or regulatable factor, the properties of the material can vary, e.g., between batches which have been produced under identical conditions. This is particularly the case with auxiliary materials where very small added quantities exert a strong modification effect.

The attempt has also been made in the field of reinforced plastic material, and especially glass fibre reinforced polyester (GFK), to obtain reactivatable single component systems that contain microencapsulated reaction partners. The attempted solution of this problem failed because a homogeneous distribution coefficient for the microencapsulated reaction initiators and a high capsule rupturing quota (at least 90 and more %) could not be achieved. The poor capsule rupturing quota is due to pressures that are too low and or too brief.

The above described disadvantageous and other negative features of the known one-component systems that contain microencapsulated reactive substances may be summarized in the following two marked negative characteristics:

1) due to high friction in the mixing process, it was not possible to produce any substances with high viscosity and/or thixotropic values, especially in the presence of angular edged and/or acute sharply tapered filler materials;

2) the pressure, shearing, rotational and/or torsional forces were not sufficient to effect an optimal capsule rupture.

SUMMARY OF THE INVENTION

It is the aim of the present invention to present improved one-component hardenable substances which by means of protective casings contain temporarily inactivated reactants, coreactants and/or modified auxiliary agents that do not display the above specified and other known negative features, and also show how to reactivate and apply the same.

More particularly, I have discovered that the problems of producing a liquid, pasty, thixotropic, semisolid or solid hardenable substance, on the basis of monomeric, oligomeric and/or polymeric compounds, and one or more components promoting hardening, where at least the monomeric, oligomeric or polymeric compounds and/or the components promoting hardening are enclosed in a protective casing that prevents reaction, with a content of protective casing rupturing agent can be avoided by using as a protective casing rupturing agent, microspheres which, upon application of mechanical forces form angular edged and/or acutely tapered particles. The microspheres operate as protective casing rupturing agents which are activateable by pressure, shearing, rotational and/or torsional forces, because on their destruction the remains are in the form of angular edged and/or acutely tapered pieces. The microspheres also operate as filling materials. Additionally, it is not necessary that the microspheres be destroyed in large quantities. Rather, it is only necessary that a sufficient amount be destroyed to provide adequate rupturing of the casing.

The intermediary free hollow spaces created after the destruction of the microspheres may, in addition, contribute towards an acceleration of the reaction and/or to producing a high coefficient of the distribution of reactive and/or modified auxiliary materials by creating internal free-flow sections. By this means, more homogeneous and intensive mixing of the substances is obtained and stresses, pressures and expansion forces can be equalized.

The microspheres according to the present invention may be made of inorganic and/or organic materials. They are preferably of hollow globular form and when they are destroyed, they must break into angular edged and/or acutely tapered particles, splinters, fragments, etc.

DESCRIPTION OF THE PREFERRED EMBODIMENT

The inorganic microspheres may be made of glass, ceramics, inflated or expanded mineral fillers such as perlites, silicates, e.g., calcium silicate. The organic microspheres may be made of plastics, such as, duroplats, e.g., amino and phenoplasts.

The grain sizes of the microspheres may vary over a wide range and their diameters are preferably <1500 m$\mu$, particularly <500 m$\mu$ (the symbols m$\mu$ or $\mu$m used in this specification denote millimicrons). They furthermore have low bulk weights and low specific weights, i.e., <1.0 g/cm$^3$, particularly <0.7 g/cm$^3$. In an event, the specific weight should be less than the specific weight of the material in which they are contained.

The substances according to this invention may contain mixtures of microspheres of varying diameters. Also, the amount of microspheres in the substances of this invention may vary over a wide range, but preferably is between about 1 and 600% by weight based on the weight of the unfilled basic materials.

The amount of microspheres is, also dependent on the content of the microencapsulates, the protective casing rupturing capacity, the degree of filling, etc. However, the one-component substances of this invention containing the microencapsulated materials should have a microspheres content between about 10 and 100, and preferably between 30 and 70% by weight with reference to the unfilled basic materials, monomeric, oligomeric and/or polymeric compounds.

The substances of this invention may be made from inorganic, organometallic and/or organic bases and may be present in liquid, pasty, thixotropic, semisolid and/or solid form. As inorganic monomeric, oligomeric or polymeric compounds, the hydraulically setting cements, such as, Portland cement, high alumina fused cement; gypsum, anhydrites, magnesite, lime, and silicates, such as, waterglass are suitable.

The organometallic systems include the silicon and/or titaniumorganic compounds, such as, organosiloxanes, silicon resins, silicon rubbers, alkyltitanates. For reactivateable one-component substances based on monomeric, oligomeric and/or polymeric materials, reactive compounds that produce cross-linked polymeric and/or elastomeric compounds by polymerization, polycondensation and/or polyaddition reactions are suitable. These include vulcanizable natural and/or synthetic rubbers and elastomeric systems, such as, butadiene-acrylonitrile-copolymerizates, butadiene-styrene copolymerizates, polysulfides; amino- and phenoplasts such as urea-, melamine-, phenol- and/or resorcin-aldehyde condensates; compounds containing vinyl- and/or diene groups, such as, acrylic and/or methacrylic acid, its esters, amides, nitriles and their other derivatives, styrene and its derivatives, unsaturated polyester resins; epoxide compounds and polyepoxides such as aromatic, aliphatic and cycloaliphatic epoxide resins, glycidyl ester, glycidyl ether; polyurethanes and other systems cross-linkable with isocyanates; polyamines, polyamides, polyimines, polyimides and their derivatives etc.

The term "components promoting hardening" or "hardening promoting agents" includes reaction initiators for the individual vulcanization-, polycondensation- and/or polyaddition systems. Thus, generally, these include reactive compounds that can initiate reactions. Besides coreactants, this group includes hardeners, such as, polyamines, polyamidoamines; known radical formers, such as, peroxides, hydroperoxides, per acid, its derivatives and salts; oxidation agents, such as, lead dioxide, manganese dioxide, isocyanates and their derivatives, mercaptanes and mercaptane compounds.

Additionally included among these components are solvents which, by swelling and/or dissolving of physical setting systems, can be applied to reactivate dry films.

Of the reaction accelerators that belong to the hardening promotors, also included are compounds that give off electrons easily and, by this means, can promote reactions, e.g., accelerated peroxide decomposition. To this category also belong heavy metal salts, amines, amides, imines, imides, mercaptanes, azo bodies, etc. This also include catalysts and similar products.

Auxiliary agents are also included so long as they remain inactive during storage and do not evaporate and/or react with other materials. Thus, they should not impart modifying qualities to the substances until during and/or after application. Such materials may be conservation agents, water repelling means, setting retarders and/or accelerators for hydraulically setting substances, wetting agents, levelling agents, etc.

With the present invention, it thus becomes possible to control the reactions of highly reactive materials, that are not controllable under normal conditions, e.g., due to too short pot and processing times due to the temporarily effective protective casing inactivation. By this means one-component systems can be produced that can become reactive at temperatures of $<0°$ C and can harden.

The reactivateable one-component substances with the microencapsulated reactive materials according to this invention are so constructed that they remain inactive during production and/or storage. The nature of the materials of a system that are to be temporarily inactivated by protective casings, so that they can be mixed with the other reactants, depends on the encapsulating technology, the type of application and the economic aspect of the given product. Preferably, such reactive materials are contained in protective casings in a system in smaller quantities. For this reason, components effecting hardening, preferably reaction initiators and/or reaction accelerators are often included in microencapsulated form in some of the reactivateable one-component systems.

The substances according to this invention can be modified by further adducts. Suitable auxiliaries to plasticizers, oils, tars, asphalts, bitumens, solvents, dyes, pigments, thixotropic agents, inorganic and/or organic fillers and fibres. Stabilizers and/or inhibitors can also be added.

The microspheres, microcapsulates and/or fillers applied in the substance according to this invention may, in addition, naturally be coated with materials that form adhesive bridges such as, silanes, chromium complexes in order to obtain reinforced joints at the border areas. To inactivate them against chemisorption processes they may be coated with substances, such as, fatty acids, fatty acid esters.

The compositions of the present invention can be prepared on all conventional mixing machines which, during the mixing process, do not develop too high a shearing force and/or friction in the substance being mixed.

Special care should be taken in the preparation of substances with high viscosity and/or thixotropic values, particularly where angular edged and/or acutely tapered fillers are incorporated. It has proven a very positive practice to moisten the microencapsulates with a liquid adduct either prior to mixing and/or in the case of liquid monomeric, oligomeric and/or polymeric substances, to incorporate the filler particles as the first component. This should be followed by adding the microspheres. In this process it has surprisingly been found that the microspheres fulfill a special function in those cases where their size exceeds that of the microencapsulates by a factor of one to three. Particularly, the microspheres exercise a protective function in regard to the microencapsulates similar to adducts which increase the viscosity and/or thixotropic features, preferably in the presence of angular edged and/or acutely tapered filler materials. The hollow globular form is probably one of the reasons for this protective function.

Where unsaturated compounds, such as, polyester, carboxylic acids and/or their derivatives with free carboxyl groups are used as reactive basis materials, it has proven advantageous to make the viscosity and/or thixotropic adjustment according to German patent (DT-OS 2 534 737).

A further aim of this invention is a method of hardening the substances, whereby the pressure, shearing, rotational and/or torsional forces to be applied prior to, during and/or after application to the substances, release the angular edged and/or acutely tapered protective casing rupturing agents from the microspheres to rupture the protective casings, whereby the destroyed casings set free the materials that effect the hardening reaction. In order to create a high capsule rupturing capacity, microsphere mixtures are preferably used whose microsphere distribution spectra is one to six times higher than that of the microencapsulates, so that not only is a uniform supply of protective casing rupturing agents provided, but also, free flow lines for more homogeneous distribution during the intermediate reaction are made available.

The reactivation process is based on the fact that as a result of the pressure, shearing, rotational and/or torsional forces, the microsphere bodies are primarily destroyed and the microencapsulates are only destroyed subsequently thereto by the rupturing agents of the spheres. The pressure forces are created preferably by pressing, friction, stamping and impact. Shearing forces are chiefly generated by stirring the substances in high-speed homogenizing machines, extruders, etc. Rotational and/or torsional forces predominate chiefly if tools, elements, etc. of the thread or screw form act upon the material, whereby, due to the additionally produced friction, the reactivation is promoted and accelerated.

In order to have an adequate reactive capacity available with unfilled one-component substances, at least 10% by weight of the microspheres are necessary based on the monomer, oligomers or polymeric substances. If, on the other hand, additional angular edged and/or acutely tapered filler particles are on hand in the one-component substance, then a lower reactivating capacity is called for, with a minimum content of 1% by weight of microspheres, based on the reactive monomeric, oligomeric or polymeric substances.

A further aim of this invention is the application of the reactiveable one-component substances of this invention in many fields of engineering, industry, trade and hobby working.

The reactivateable one-component substances of this invention can be adapted in composition, reactivity, reactivateability, rheological properties and technical values in cured or penetration hardened condition to the required specified processing technologies and/or prospective purposes for which they will be used. More universal reactivateable one-component substances for multiple fields of application can, however, also be made available.

The one-component substances according to this invention are packed in tubes, cartridges, cans, hobbocks, etc., and they can be stored for several months. The substances of this invention can be used for adhesive, sealing, spackling, filling, stamping and/or coating purposes.

In addition, the reactive one-component substances of this invention can be used in patterns and/or toolmaking as well as for the production of pressed, hollow and/or injection moulded bodies.

If the substances of this invention are constructed on the basis of duroplasts, their cured or hardened products are characterized by high mechanical strength, good dimensional stability relatively dense structure and are particularly good machining by hand or cutting tools if the microsphere body share is high and the content of hard, coarse-grained filling materials is low.

With the reactivateable one-component substances of this invention, a multiplicity of materials and/or substrates can be joined together, sealed, spackulated and/or coated. If applied as stamping and/or filling materials, they are adapted to fill holes, cavities, etc. The materials and/or substrates may be of metals, such as, steel, iron, aluminum, copper; inorganic materials, such as, stone, concrete, glass ceramics; elastomeres; plastics, such as, thermoplasts, duroplasts; wood and wooden materials, plastic film materials, plastic laminates; textile materials, paper, cartons, etc.

Such jobs as joining, sealing, spaculating, coating and/or filling occur in many technical fields of research, industry, trade and hobbyist activities. This also includes above and below surface building as well as interior architecture; wood and plastics processing industries; automobile, ship and aeroplane building; machine and apparatus building, electrotechnical engineering, pattern and toolmaking as well as in many fields of trade, such as, electric and sanitary installations, assembly and erecting, repairs, etc.

A particular form of application of the substances of this invention is their use as a reactivateable adhesive, sealing and/or spackling compounds for assembly and/or repair jobs.

With an adhesive after this invention, e.g., securing elements, such as, screws, tie bars, etc., can be set into boreholes and secured and bonded without any additional mechanical securing means. With the same substances, such components as flanges can be bonded and sealed.

Another particular form of application of the reactivateable one-component substances of this invention is the precoating of materials and or substrate surfaces that are to be joined or sealed.

It is, for example, possible to precoat screws and joining surfaces of plug-in connections with such a substance. The layer thicknesses can, in this case, be selected to that they overlie the tolerances to be expected or the play possible in the hollow space of the joint. In the plugging-in or screwing none or only very minor amounts of the superfluous coating material are removed, because the microspheres contained therein, beside acting to rupture the casing material, also attend to the levelling and self-sealing action of the filling material.

A further form of application on the basis of this invention is the precoating of laminates, such as, laminate boards of UP-resins, melamine resins, etc., PVC board, profiled sealing strips of rubber, asbestos, etc., with solvent reactivateable contact adhesives that contain microencapsulated solvents and microspheres.

The applied adhesive coat is dry, nontacky and storable and is reactivateable upon pressure and/or impact forces.

A further preferred form of application according to this invention is the application of dry powder preparations, films, foils and/or laminates that contain micrencapsulated reactive substances, microspheres and/or other auxiliary means and that become reactive due to mechanical stresses, such as, pressure, shearing, rotational and/or torsional forces. The powder mixtures may be constructed from an inorganic base, such as, cements, line and/or on the basis of organic binding agents. The films and/or laminates referred to are organic polymers and/or binding agents that, e.g., are processed by pressure, vacuum and/or heat.

An additional form of application under this invention is the use of reactivateable one-component substances in pattern and tool making. To this end substances can be used which, e.g., are hardly plastic at room temperature, but at slightly raised temperature, e.g., at hand temperature, can be formed and kneaded and react, and after their penetration hardening can be machined by cutting tools. They are, however, also suited for all other forms of use in technology wherein forces occur that are sufficient to activate the protective casing rupturing agents.

Another preferred form of application for the reactivateable substances of the present invention lies in the production of pressed, hollow and/or injection moulded bodies. There are, for instance, available in the field of reinforced plastics, preferably glass fibre reinforced polyester and their duromeres and/or thermoplasts, not only suitable technologies, such as, autoclave methods, pressure vacuum methods, pressure bag moulding methods, and hot and cold pressing techniques for processing the reactivateable one-component substances of this invention, there are also the prefabricated liquid, pasty, thixotropic, solid and/or powdery one-component systems which, as intermediate products, offer a number of advantages as pressing substances and/or prepegs.

Such one-component substances according to this invention display more homogeneous compositions, uniform reactivity, have no pot and processing times and are storable for several months.

In industrial engineering, in commerce, trade and hobbyist activities, there exist a number of further possibilities of application for the reactivateable one-component substances according to this invention which cannot be listed individually here.

As a result of the present invention, new and improved reactivateable one-component substances for many fields of utilization and application which do not possess the negative features described above are made available. These materials also display a number of additional, characteristics in processing and application that have long been described in industrial practice. These beneficial features are as follows, depending on the respective one-component substances:

- a one-component system possessing the known benefits of a two-and more component substance;
- easy and noncritical application, as no mixing of two- or more components is necessary;
- no mixing errors;
- easy and uniform reactivateability;
- no pot and processing times;
- programmed reactions, such as, gelling and hardening times;
- self-levelling and/or compacting properties;
- adhesion-free adjustment of deforming and/or kneading properties;
- adjustable permanent viscosity and/or thixotropic values;
- minor-shrinking and/or shrink-free curing and penetration hardening;
- reduction or prevention of internal stresses and cracking;
- good storage stability of the substances;
- reduction and/or elimination of physiological and toxicolgical and/or environmental problems in the application and processing of dangerous working materials.

The following examples give a more detailed description of the invention but they do not limit the invention to these examples.

In general, the data given in the examples regarding quantity and ratio refer to the weight.

EXAMPLE 1

To determine the activateable capacity of the protective casing rupturing agents, the following four mixtures were prepared of dyed, toluene-containing microencapsulates, microspheres and quartz sand:

| | |
|---|---|
| Mix. No. 1: | 100 pbw[x)] microencapsulates, grain size: <100 μm |
| Mix. No. 2: | 100 pbw microencapsulates, grain size: <100 μm<br>10 pbw quartz sand, grain size 100–300 μm |
| Mix. No. 3: | 100 pbw microencapsulates, grain size <100 μm<br>10 pbw microspheres of inflated silicate, grain size 100–300 μm |
| Mix. No. 4: | 100 pbw microencapsulates, grain size: 100 μm<br>5 pbw microspheres, grain size 100–300 μm<br>5 pbw quartz sand, grain size 100–300 μm | pbw[x)] = parts by weight

Samples of 5 pbw of each of these mixtures were spread between 2 thick plates of glass and the full surfaces of each spread were loaded with increasing pressures. After the test pressure was attained, it was kept constant for 60 seconds and then again released. The results obtained are listed in the following Table 1:

Table 1

| | % of capsule rupture or destruction at pressures of in kp/cm² | | | | |
|---|---|---|---|---|---|
| | 0.1 | 0.5 | 1.0 | 2.0 | 5.0 |
| Mixture No. 1 | 0 | 0 | 0 | 0 | 0 |
| Mixture No. 2 | 0 | 0 | 0 | 10 | 35 |
| Mixture No. 3 | 75 | 90 | >90 | 100 | 100 |
| Mixture No. 4 | 70 | 85 | >90 | 100 | 100 |

The comparative testing and its results listed in Table 1 indicate that the activateable capacity of the microspheres as protective casing rupturing agents is a multiple greater than the pressure alone or the pressure in connection with an angular edged and/or acutely tapered filling material. In addition, said testing makes it evident that with a content of angular edged and/or acutely tapered filling material, the quantity of microspheres can be reduced.

EXAMPLE 2

The following three one-component adhesives were produced as an adhesive doweling compound:

| | |
|---|---|
| Adhesive 1: | 100 pbw UP-resin[x)]<br>10 pbw mixroencapsulated peroxide, 40%, grain size: <50 μm<br>30 pbw microspheres of inflated silicate grain size : <300 μm<br>2 pbw magnesiumoxide<br>2 pbw zincoxide<br>8 pbw olefine graft copolymer powder with 2.1% acrylic acid<br>20 pbw Neuburger silica (flinty earth) coated, grain size: <10 μm |
| Adhesive 2: | 100 pbw UP-resin[x)]<br>10 pbw microencapsulated peroxide, 40%, grain size <50 μm<br>2 pbw magnesium oxide<br>2 pbw zinc oxide<br>8 pbw olefin graft copolymer powder with 2.1% of acrylic acid<br>30 pbw quartz sand, coated, grain size <300 μm<br>20 pbw Neuburger silica (flinty earth), coated, grain size: <10 μm |
| Adhesive 3: | 100 pbw UP-resin[x)]<br>10 pbw microencapsulated perioxide, 40%, grain size : <50 μm<br>2 pbw magnesium oxide<br>2 pbw zinc oxide<br>8 pbw olefine graft copolymer powder with 2.1% acrylic acid |

-continued

| 50 pbw Neuburger silica (flinty earth), coated, grain size: <10 μm |

*) UP = unsaturated polyester viscosity: 1.700 cp
styrene content: 32%
acid number: 28

For application, the adhesive dowelling compounds were filled into cartridges. After making boreholes in a concrete of Class B 300, the boreholes were cleaned and filled with adhesive dowelling compound. Into the thus filled boreholes, normal steel screws were inserted by hand and tie rods inserted by machine. Table 2 lists the results obtained.

Table 2

| dimensions of screws, tie rods | adhesive No. | borehole diameter in mm | inserted by | hardening time in hrs. | power required to pull out of borehole / kp | Remarks |
|---|---|---|---|---|---|---|
| Steel screws | 1 | | | 1 | 60 | good penetration |
| M 4 | 2 | 4.0 | hand | 12 | 30 | hardening penetration hardening |
| | 3 | | | none | 0 | soft substance no hardening |
| Steel screws | 1 | | | 1.5 | 62 | good penetration |
| M 4 | 2 | 4.5 | hand | 19.0 | 35 | hardening penetration hardening |
| | 3 | | | none | 0 | soft substance no hardening |
| Tie rods | 1 | | | 0.5 | 1.200 | good penetration |
| M 12 | 2 | 12.5 | machine | 15.0 | 1.000 | hardening pentration hardening |
| | 3 | | | 24.0 | 600 | no penetration hardening |
| Tie rods | 1 | | | 1 | 1.150 | good penetration |
| M 12 | 2 | 13.0 | machine | 16 | 1.090 | hardening penetration hardening |
| | 3 | | | 24 | 400 | no penetration hardening |

*) all values given are average values from 5 tests each

The results listed in Table 2 indicate that the microsphere addition in Adhesive No. 1, in contrast to Adhesive No. 3, has a greater activateable capacity as protective casing rupturing agent and therefore a greater hardening rate due to improved intermixing and accelerated pulling out values.

EXAMPLE 3

The following 2 adhesive mixtures were produced for precoating purposes:

| Adhesive No. 1: | 25 pbw mixroencapsulated methacrylate adhesive, grain size: <200 μm 15 pbw resin binding agent 4 pbw highly dispersed silicic acid 6 pbw benzoyl perioxide, 40% in plasticizer 50 pbw solvent mixture of benzine 60/90: tuolene 1 : 1 |
| Adhesive No. 2: | Has same composition as Adhesive No. 1 plus 10 pbw of microspheres. |

The resin binding agent contained in the Adhesives No. 1 and No. 2 is required as a carrier and binder for the fixation of the microencapsulate on the surface.

With these adhesives, 10 screws each of M 10 size were coated in such a way that after drying, approx. 50% of the thread roots were filled up. Then nuts with an initial tension of 3mkp were screwed on and tightened. By screwing the nut on the screws precoated with Adhesive No. 1, the coating was partially pushed away, whereas on the screws coated with Adhesive No. 2, the layer was incorporated into the thread by the self-levelling and compacting properties of the adhesive. The breaking out moments after 3 hours were as follows:

| Screws with Adhesive No. 1: | 200 cm kp variation coefficient: 40% |
| Screws with Adhesive No. 2: | 310 CM KP variation coefficient: 18% |

EXAMPLE 4

The following two preaccelerated adhesive mortars were prepared:

| Adhesive No. 1: | 100 pbw UP-resin *) 15 pbw microencapsulated perioxide, 40%, grain size: <100 μm 2 pbw cobaltoctoate, 2% in plasticizer 40 pbw microspheres, grain size: <300 μm 1 pbw magnesium oxide 3 pbw zinc oxide 1 pbw highly disperse silicic acid 5 pbw olefine graft copolymer powder 6.0% acrylic acid 33 pbw quartz sand, coated, grain size 0.1–0.3mm |

*) styrene content: 40%
acid number: 24
viscosity: 600 cp

Adhesive No. 2: In the recipe for Adhesive No. 1, 40 pbw of quartz sand, grain size 0.1 - 0.3 mm was used in place of 40 pbw microspheres.

At test specimens, concrete bricks were used. These bricks were pretempered by placing them in a deep freezer for 24 hours at −21° C and then the adhesives 1 and 2 were applied to the surfaces to be laid. Altogether, 4 test specimens were prepared. The concrete bricks were firmly pressed into the adhesive bed and the test specimens again placed in the deep freezer at −21° C.

After 4 hours, test specimen No. had set and after being placed under a breaking load, the break occurred outside of the adhesive mortar joint. Adhesive No. 2 only showed setting after 24 hours. The test specimens could be separated by hand at the mortar joints.

EXAMPLE 5

The following 2 sealing compounds were produced:

| | |
|---|---|
| Sealing Compound No. 1: | 100 pbw polysulfide polymer<br>5 pbw microencapsulated lead dioxide, grain size: 100–300 μm<br>30 pbw microspheres, grain size: 300 μm<br>30 pbw chlorinated plasticizer<br>5 pbw highly disperse silicic acid<br>45 pbw filler, e.g., chalk, coated |
| Sealing Compound No. 2: | 100 pbw polysulfide polymer<br>5 pbw microencapsulated lead dioxide, grain size: 100–300 μm<br>30 pbw chlorinated plasticizer<br>5 pbw highly disperse silicic acid<br>45 pbw filler, e.g., chalk, coated<br>30 pbw quartz sand, grain size: 0.3mm |

Each sealing compound was applied between 2 flange surfaces and screwed firmly together. After 24 hours sealing compound No. 1 was vulcanized through, whereas sealing compound No. 2 was still plastic and soft.

EXAMPLE 6

The following spackulating, filling and stamping substance was prepared:

100 pbw acrylopolymer[+)]
8 pbw microencapsulated peroxide, 40%
50 pbw microspheres, grain size <300 μm
150 pbw quartz sand <0.5 mm
2 pbw highly disperse silicic acid

[+)]acrylopolymer 40% dissolved in acrylomonomeres
viscosity: 2.500 cp

Concrete surfaces were spackulated with a part of this substance. After 8 hours the surfaces were hardened through and grindable. A borehole was filled with the remainder of this substance and stamped in with a steel chisel.

After 4 hours, the substance had hardened.

EXAMPLE 7

The following 2 adhesive and coating substances were prepared:

| | |
|---|---|
| Adhesive No. 1 | 100 pbw epoxide resin, microencapsulated, epoxide value: 0.5, grain size: <300 μm<br>100 pbw polyamidoamine (hardner)<br>40 pbw microspheres, grain size: 300 μm<br>5 pbw highly disperse silicic acid<br>55 pbw chalk, coated |
| Adhesive No. 2: | The recipe of Adhesive No. 1 was modified by using 40 pbw of quartz sand, grain size 0.3mm in place of 40 pbw microspheres. |

Both adhesives were separated and each of the following bondings and coating were made:
a) concrete on concrete the adhesive was applied with a spatula, which was subsequently pressed.
b) the coating was applied to an artificial stone surface and spread with a spatula.

On the concrete/concrete bonding, Adhesive No. 1, after 24 hours, produced a monolithic bond. The break occurred outside of the bonded joint. Adhesive No. 2 took 6 days to harden and the break occurred in the border surfaces of the adhesive zone.

On the spatula-applied artificial stone surfaces, Adhesive No. 1 had produced a homogeneous coating after 24 hours, whereas Adhesive No. 2 was still tacky.

EXAMPLE 8

The following wood glue on a watery dispersion base was prepared:
100 pbw polyvinylacetate dispersion, homopolar, 50%
5 pbw microencapsulated vanadiumacetylacetonate, 10% in glycolbutylester
35 pbw microspheres, grain size: 100–300 μm
30 pbw gypsum This wood glue was applied to glue dowels in beech wood. After 8 days of storage, the glued specimens were stored for 4 weeks in cold water. Whereas in the "zero" test gluing, i.e., without microencapsulated vanadiumacetylacetonate, the glue joint opened after 2 weeks, the other specimen was in impeccable condition after 4 weeks. Vanadiumacetylacetonate must not be directly worked into the glue dispersion, as the dispersion will coagulate immediately.

EXAMPLE 9

A commercial type of polychloroprene adhesive was mixed with the following substances:

| | |
|---|---|
| Adhesive No. 1: | 100 pbw polychloroprene adhesive<br>25 pbw toluene microencapsulates, grain size: <100 μm<br>25 pbw microspheres |
| Adhesive No. 2: | 100 pbw polychloroprene adhesive<br>25 pbw toluene microencapsulates |

Rubber profile materials were coated with these adhesives. After evaporation of the solvents, these profiles were stored for 14 days. The profiles with the reactivateable coats of adhesive were then placed on a beech wood surface and subjected to strong hammer blows. After 10 minutes, the profiles coated with Adhesive No. 1 were bonded to the wood, whereas in the Adhesive No. 2 only random spots of the profiles were bonded.

EXAMPLE 10

Speciments of the adhesive described in Example 2 were packed in cartridges and stored for 6 months at room temperature. As described in Example 2, bonding insertion of steel screws was made with these substances. The rheological properties and the strength values correspond to the original results.

EXAMPLE 11

The following 2 resin mats were prepared:

| Resin Mat No. 1 | |
|---|---|
| Resin composition: | 100 pbw UP (unsaturated polyester) resin mixture<br>4 pbw microencapsulated perioxide 40%, grain size: <40 μm<br>100 pbw chalk, coated<br>5 pbw zinc stearate<br>1 pbw magnesium oxide<br>40 pbw microspheres, grain size: 0.1–0.3 mm |

A glass fibre mat was impregnated with this resin mixture. The glass content in the resin mat amounted to approximately 30% by weight.

| Resin Mat No. 2 | |
|---|---|
| Resin composition: | 100 pbw UP resin mixture<br>4 pbw microencapsulated peroxide |

Resin Mat No. 2

| | |
|---|---|
| | 40% grain size <40 μm |
| | 140 pbw chalk, coated |
| | 5 pbw zince stearate |
| | 1 pbw magnesium oxide |

A glass fibre mat was impregnated with this resin solution. The glass content comprised approx. 30% by weight. Both substances were pressed at 140° C and a pressure of 4 kp/cm². Resin mat No. 1 was correctly and satisfactorily hardened, whereas resin mat No. 2 was still sticky and soft.

While specific embodiments of the invention have been shown and described in detail to illustrate the application of the inventive principles, it will be understood that the invention may be embodied otherwise without departing from such principles.

What is claimed is:

1. In a hardenable composition of the type composed of a mixture of a first component of a monomeric, oligomeric or polymeric compound and a hardening promoting agent wherein one or both of the first component and the hardening agent is encased in a protective casing which prevents the reaction and subsequent hardening of the composition until rupture of the casing and which further contains a casing rupturing agent, the improvement which comprises said rupturing agent being microspheres which break under the pressure applied in the normal use of the composition into fragments possessing angular edges or which are acutely tapered.

2. The composition of claim 1 wherein the microspheres are hollow.

3. The composition of claim 1 wherein the microspheres are composed of inorganic materials.

4. The composition of claim 3 wherein the microspheres are silicates.

5. The composition of claim 4 wherein the microspheres are composed of calcium silicate.

6. The composition of claim 1 wherein the microspheres are selected from the group consisting of hollow glass bodies, hollow ceramic bodies and hollow plastic bodies.

7. The composition of claim 1 wherein the microspheres have a diameter of less than 1,500 millimicrons.

8. The composition of claim 1 wherein the microspheres have a specific weight of less than 1.0 g/cm³.

9. The composition of claim 1 wherein the microspheres are present in an amount of about 1 to 600% by weight, based on the weight of the monomeric, oligomeric or polymeric compounds.

10. The composition of claim 1 wherein the individual microspheres have a volume one to three times greater than that of the protective casings.

11. The composition of claim 1 wherein the hardening promoting agent is selected from the group consisting of inorganic oxidation agents, organic oxidation agents, metal oxides, peroxy acids, peroxides, hydroperoxides, amines, imines, mercaptans and azo compounds.

12. The composition of claim 1 wherein the hardening agent has a particle size of <1500 μm.

13. The composition of claim 1 which further contains filling materials.

14. The composition of claim 1 wherein the microspheres, protective casings or filling materials are pretreated with compounds selected from the group consisting of silanes and chromium complexes.

15. The composition of claim 13 wherein the microspheres or the filling materials are treated with antichemisorption agents selected from the group consisting of fatty acids and fatty acid derivatives.

16. A method for making a hardenable composition comprising admixing a first component of a monomeric, oligomeric or polymeric compound, a second component of a hardening promoting agent said first or said second component being encased in a protective casing which prevents the reaction and subsequent hardening of the composition until rupture of the casing and a third component of a rupturing agent composed of microspheres which break under the pressure applied in the normal use of the composition into fragments possessing angular edges which are acutely tapered.

* * * * *